April 8, 1958 A. DIENY 2,829,796
TIGHT CLOSING DEVICE FOR INTERNAL PRESSURE VESSELS
Filed Oct. 20, 1954 2 Sheets-Sheet 1
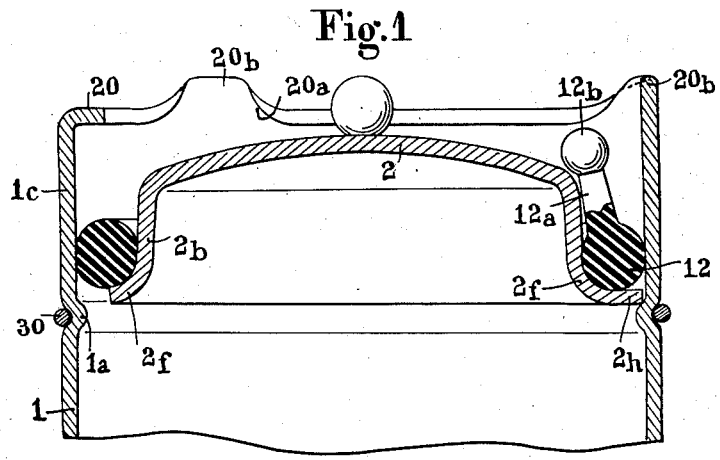
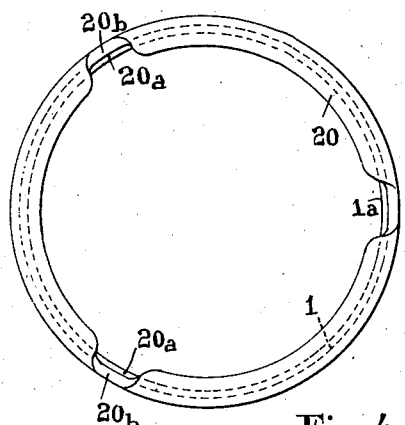
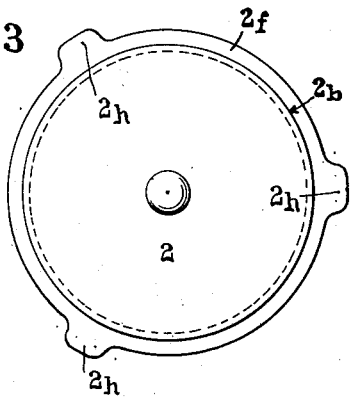
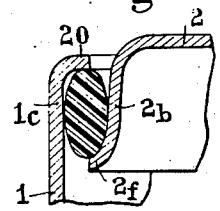
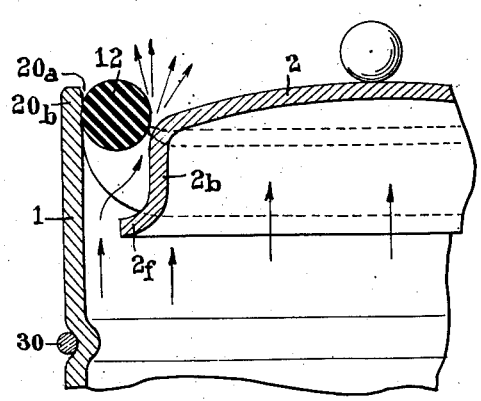
INVENTOR:
ALFRED DIENY
BY:

April 8, 1958  A. DIENY  2,829,796
TIGHT CLOSING DEVICE FOR INTERNAL PRESSURE VESSELS
Filed Oct. 20, 1954  2 Sheets-Sheet 2

INVENTOR:
ALFRED DIENY
BY:

United States Patent Office 2,829,796
Patented Apr. 8, 1958

2,829,796
TIGHT CLOSING DEVICE FOR INTERNAL PRESSURE VESSELS

Alfred Dieny, Paris, France

Application October 20, 1954, Serial No. 463,518

Claims priority, application France October 31, 1953

1 Claim. (Cl. 220—44)

The present invention has for its object a tight closing device for all types of vessels subject to an inner pressure, namely for economical pressure cookers.

These cookers are generally fitted with flat gaskets disposed between two more or less plane surfaces provided, respectively at the upper part of the body of the cooker and underneath the lid. The steam tightness is then obtained owing to mechanical means ensuring the powerful tightening of the lid on the body of the cooker and the compression of the interposed gasket. These mechanical means are relatively complicated, the result being that the manufacture of these cookers is costly and their use is neither much safe, nor very easy.

For that reason one of the aims of the invention is to make a particularly simple steam-tight closing device, easy to use and providing complete guarantee of safety.

Another aim of the invention is to use, for obtaining the closing tightness, the rising pressure which exists in the inside of the vessel when in use.

Still another aim of the invention is to make the closing device in such a manner that it acts also as a compression relieving system and a pressure regular, allowing automatically the escape into the atmosphere of the fluid in excess of the volume provided for inside the vessel.

The device according to the invention is characterised in that the edge of the opening of the body of the vessel is bent to form an inwardly extending flange practically in the plane of this opening, whereas the lid has a peripheric part parallel to the wall of the vessel body and extending to a certain distance from the latter, this part of the lid terminating with an inwardly extending flange the outside almost at right angle, and upon which is placed an annular gasket of plastic material, for instance in rubber, which is thus contained between the wall of the vessel body and the part of the lid parallel to it. The pressure inside the vessel pushes the lid upwards in such a way that the plastic gasket is compressed between the outwardly extending flange of the lid and the inwardly extending flange of the vessel body, and ensures thus a perfect steam-tightness in relation to the pressure inside the vessel.

In a preferred arrangement of this device, the body of the vessel, or at least its part near the opening, is cylindrical and the part of the lid parallel to this wall is also cylindrical, the diameter of the gasket being slightly larger than the free annular space between these two parts and the gasket being fitted quite tight around the cylindrical part of the lid, so that the lid and the gasket form a movable assembly, moving like a piston in the cylindrical body of the vessel under the effect of the internal pressure.

According to another possible characteristic of this device, inwardly extending flange of the vessel body has at least one cut out part of limited length, making possible a partial automatic lifting of the gasket at this spot when the inside pressure reaches a predetermined limit. Preferably, the toric gasket is provided with an extension making it possible to get hold of it, this extension being eventually placed in the cut out part of the extending flange of the vessel in such a way that its free end projects outside the vessel.

The present invention has also vessels as its object, particularly pressure cookers, fitted with the tight closing device which has been described.

Other particularities of the object of the invention will appear in the following description of two possible constructions of a pressure cooker incorporating the said tight closing device. This description is given by way of a nonrestrictive example, with reference to the accompanying drawings, in which:

Fig. 1 is a sectional elevation of the upper part of a cooker incorporating the tight closing device according to the invention;

Fig. 2 is a top plan view of the vessel body;

Fig. 3 is a top plan view of its lid;

Fig. 4 is a partial sectional elevation with the section taken when the toric gasket moves upwards under the action of a given pressure;

Fig. 8 represents another shape of the section of the plastic gasket used.

Figure 5:
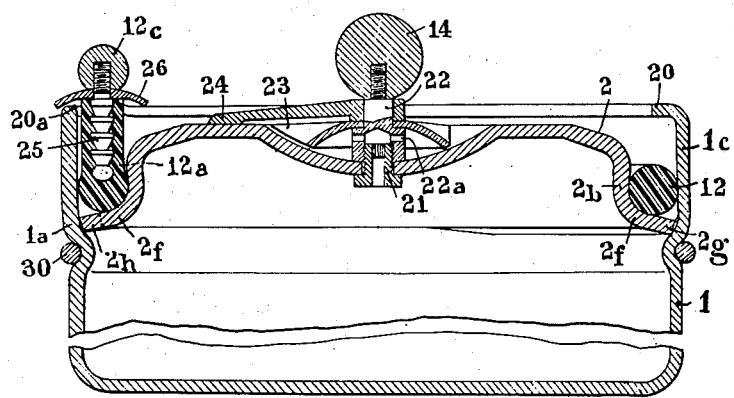
Fig. 5 is a sectional elevation of another type of construction of a cooker according to the invention.

The cooker represented consists of a body 1 and a lid 2. According to the invention, the lateral wall of body 1, or at least its part 1c nearest to the opening, is cylindrical, and the upper edge 20 is bent to form a flange extending inwardly in a plan which is sensibly perpendicular to the axis. As for lid 2, it has a part 2b parallel to the wall 1c of body 1, therefore cylindrical. The diameter of this cylindrical part 2b is smaller than that of body 1, so that an annular space is left free between this part 2b and the inner face of the wall of body 1. The cylindrical part 2b terminates wtih a flange 2f extending outwardly at almost right angle, the outside diameter of which is slightly smaller than the inside diameter of the inwardly extending flange 20 of body 1. The flange 2f of the lid is provided with three extensions 2h designed to each the inner face of body 1 when the lid is placed inside the latter, in order to ensure a perfect centering of the lid. At a certain distance of its upper edge, body 1 has an inner shoulder 1a located in a plan perpendicular to the axis. The purpose of this shoulder is to limit the sinking down of the lid 2 into body 1, used as a thrust to the extensions 2h of this lid.

The inwardly extending flange 20 of body 1 is provided with at least three cut out parts 20a of larger section than the surface of extensions 2h of the lid. The bottom of these cut out parts is in the continuation of the inner face of the cylindrical wall 1c of body 1. The purpose of these cut out parts is not only to allow the passage of extensions 2h of the lid when introducing the latter in body 1, but it has another very important purpose to fulfil as will be explained later on.

On the flange 2f of the lid is placed a toric gasket 12 made of a plastic material, rubber for instance, which therefore encircles the cylindrical part 2b of the lid. The diameter of this toric gasket is slightly larger than the annular space which is left free between the part 2b of the lid and the inner face of the wall 1c of body 1. The respective dimensions of the various components or of their various parts are such that the gasket 12 encircles the part 2b of the lid, so that this gasket exerts a stronger tightening on the part 2b of the lid than on the wall 1c of body 1.

The gasket 12 has an extension 12a terminating with an enlargement 12b. This extension, which forms thus a holder for the gasket, is to be placed into, or opposite, of a cut out part 20a of the inwardly extending flange 20 of body 1, but by reason of its dimensions it can be located at any other point in the space included between the inwardly extending flange of the vessel and the upper part of the lid. The extension 12a of gasket 12 can be moulded with the body of this gasket or added to it.

To use the cooker for the cooking of an alimentary product, one introduces the lid 2 into the body 1 after having placed the product in that body. Then, the gasket 12 is introduced into the annular space included between the inner cylindrical parts of the vessel and the outer parts of the lid ensuring thus the initial tightness of the closing system. The introduction of the lid is made in passing its extensions 2h through the cut out parts 20a of the inwardly extending flange 20 of body 1. Under the action of its weight, the lid 2 sinks into body 1 until its extensions 2h come to butt against the inner shoulder 1a (see Fig. 1). The lid 2 remains held on that shoulder as long as the pressure does not rise in the inside of the cooker. But as soon as this pressure increases, the whole of the lid and gasket, which is lifted by this pressure, moves into body 1 as a piston, the gasket 12 being fitted tightens over part 2b of the lid. The mobile assembly of the lid and gasket stops when the gasket comes to butt against the inwardly extending flange 20 of the body 1. The increasing pressure inside the cooker produces the compression of gasket 12, and on that account the latter ensures a completely steam-tight closing of the cooker. The more the pressure increases, the more gasket 12 is compressed between the flange 2f of the lid and the flange 20 of the body, and the better is the steam-tightness, the gasket being applied more and more strongly against the part 2b of the lid and the wall 1c of body 1. In this position, the enlargement 12b of the free end of extension 12a of the gasket of course, extends outside the cooker.

If the pressure in the inside of the vessel goes beyond the predetermined value for which the dimensions of the gasket and of one of the considered cut out parts have been calculated, the gasket submitted to the internal pressure is lifted at the spot of the cut out parts of the flange 20 of body 1. To be more precise the gasket gets deformed according to a curve, the axis of which passes through the centre of the annular space included between the internal cylindrical parts of the body and the external parts of the lid and the summit of which is on a line equidistant from the edges of cut out part 20a.

As the bottom of the cut out parts 20a is of preference formed by a cylindrical part in the prolongation of the internal face of the wall 1c of body 1, the gasket 12 subjected to a sufficient pressure, finds always on that side of body 1 an identical supporting surface, the result being that on that side the tightness is maintained through peripheral contact. On the other hand on the lid side, the gasket does not meet anymore a cylindrical resting surface if the deformation is important enough. The contact at one point is then broken off between the gasket and the upper part of the lid (see Fig. 4). The fluid in excess to the internal volume corresponding to a given pressure can thus escape through that leakage.

If the pressure decreases inside the vessel, the gasket by reason of its elasticity takes automatically a position ensuring with the lid the tightness of the whole.

To remove the lid 2 after cooking of an alimentary product, it is necessary first to proceed with the release of the internal pressure. This can be done by the operation of a valve provided to that effect on the lid. After the release of the pressure the lid can sink inside body 1, this is indispensable to proceed with the removal of gasket 12 by means of the holding part 12a, this removal being itself necessary to be able to take the lid off.

But thanks to the cut out parts 20a of the flange 20 of the body 1 and to the holding part 12a of gasket 12, the release of the internal pressure can be obtained without it being necessary to provide a valve on the lid 2; in fact one can exert a traction on the holding part 12a of gasket 12 to produce a partial lifting of the gasket at the spot of cut out part 20a through which passes the part 12a. An escape to the atmosphere is therefore produced as in the case considered previously. Thus the device according to the invention can also be used as an efficient system of pressure release, easy to operate. After pressure release, the lid 2 can sink into the inside of body 1, this is indispensable to operate the removal of the toric gasket 12 in order to be able to take off the lid.

To remove the lid, one can also await that a condensation takes place inside the cooker, a relative vacuum is produced making it possible for the piston consisting of the assembly of the gasket and lid, to sink under the action of the atmospheric pressure. At this moment it is then easy to extract the gasket 12 in grasping it by its holding part 12a.

Figure 6:
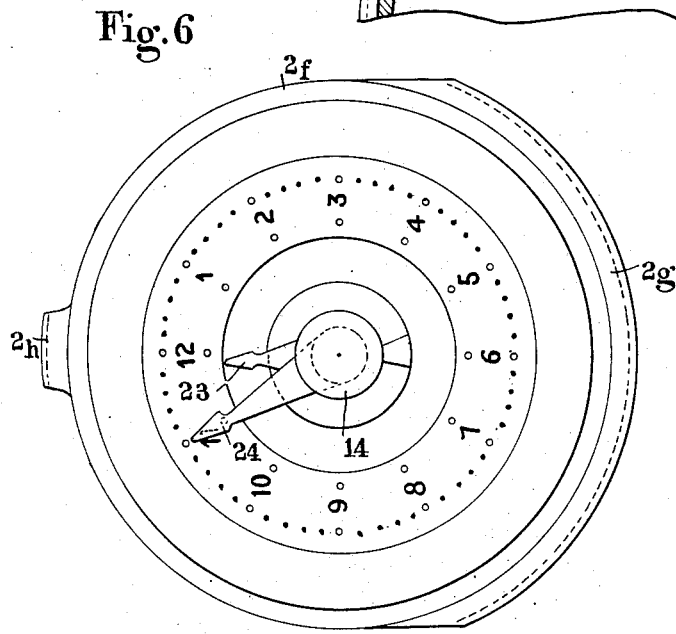
Fig. 6 is a top plan view of a lid of this cooker.

Figs. 5 and 6 represent another way of making a cooker according to the invention. In this arrangement, the vessel 1 has only one single cut out part 20a on its flange 20 which extends over the whole periphery, except of course at the spot of the cut out part 20a. As regards the lid 2, it has always a cylindrical peripheric part 2b the lower rim of which is bent almost at right angle in order to make a flange 2f. But this flange has only two very unequal extensions 2h and 2g the outside diameter of which is slightly smaller than the inside diameter of the vessel 1, in order that they may rest upon the inner shoulder 1a of the vessel ensuring at the same time the centering of the lid. As one may notice on Fig. 6, the extension 2g has a width smaller than half the circumference of the lid, but extension 2h has a very reduced width, smaller than that of the cut out part 20a.

On account of this very particular shape, the lid can be inserted in the vessel 1 although the latter has only one cut out part 20a in its flange 20.

The plastic toric gasket 12 is provided always with an extension 12a. But in the latter a part 25 is embedded during moulding the free end of which carries a handle 12c, a washer 26 being put between this handle and extension 12a. This washer is in the shape of a deflector to protect the hand of the operator from the heat emitted by the escape of steam produced at this spot when pulling on the joint by means of the handle 12a.

The central part of the lid 2 has a concave shape and is drilled with a hole making it possible, by means of a hollow screw 21, to ensure the fixing of an axle 22 upon which are mounted hands 23 and 24 as well as the operating handle 14.

Beyond the concave part of the lid, there is a plane surface upon which engravings have been made representing the hours and the minutes in a similar way as a clock dial.

This outside plane part of the lid extends to a convex part to be joined to the cylindrical part 2b.

The hollow screw 21, the hole of which could eventually be filled with an alloy melting at a given temperature in order to make a safety fusible, is used to fix axle 22 at the centre of lid 2. The axle 22 is drilled with a hole 22a used eventually for the passage of the steam in case of melting of the alloy contained in the hollow screw 21. On axle 22 is mounted a first hand 23, called hours hand, the central part of which is circular and can act as deflector, and a second hand 24, called minutes hand, as well as an operating knob 14.

The extremely simple means, of a low cost price, facilitate the use of the cooker. For instance: if at 11h30 the specified temperature is obtained and ascertained by an escape of steam at the spot of the cut out part 20a where the deformed gasket breaks the zone of tightness initially arranged, and that one knows from experience that a cooking time of 25 minutes is required at this temperature for cooking the food contained in the vessel, the operator simply places the hand of the hours on the dial, slightly before 12 o'clock and the hand of minutes at 11h55 so that at each instant from that moment, and without having to make any memory effort, he knows in glancing simply at the upper part of the vessel, that at five minutes to twelve the cooking will be completed.

Finally the mounting of the handles of the cooker themselves present interesting particularities. In fact, this mounting is obtained without soldering on the cooker nor the drilling of any hole in the latter, as one might notice from Fig. 7 which is a horizontal sectional view of the cooker. As this is a partial view it shows only one of the handles, but the mounting of the whole can be easily understood.

Figure 7:
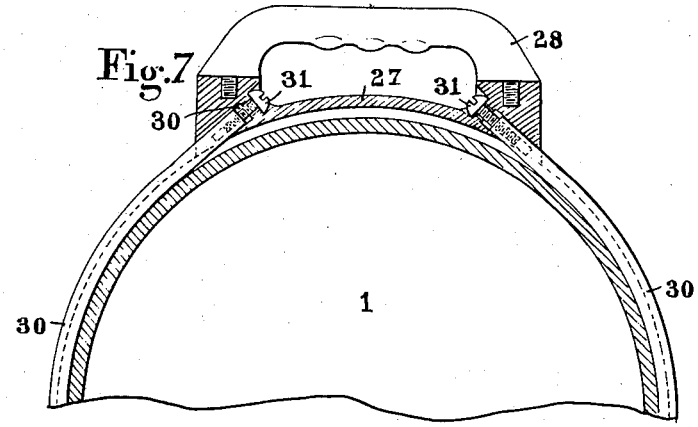
Fig. 7 is a partial horizontal section view of the cooker, with the section taken on the line VII—VII of Fig. 5.

The two handles which are mounted diametrically opposite from one another, consists each of a metallic base 27 and of a body 28 of insulating material (see Fig. 7). The face of the base which is opposite to body 28 is provided with a curve identical to that of the cooker. Each side of the base 27 has a channel 29 in which fits the end of a metallic rod 30 placed in the groove of the external surface of the cooker corresponding to the internal shoulder 1a. This rod 30 encircles almost half of the periphery of the cooker and the other end fits into the channel 29 on the corresponding side of the second handle. The two handles are thus therefore connected by means of two identical rods 30 forming two half-collars. The ends of these two rods are tapped and a screw 31, the head of which rests on the corresponding base 27, is screwed in each of its ends. In tightening the various screws 31, one ensures the joining of the handles between themselves and their perfect fitting on the cooker. The mounting of the handles is therefore very simple and gives complete satisfaction. Besides, the collar formed by the two rods 30 and the handles constitute a reinforcement of the lateral wall of the cooker.

As one might notice, the tight closing device according to the invention is particularly simple and efficient. This arrangement makes it possible to simplify greatly the manufacture of the vessels to which it is applied. In fact a pressure cooker using this arrangement can be manufactured in sheet material by flanging and repousse work. At any rate, the use of these devices makes it possible to reduce considerably the cost price of pressure cookers.

Obviously the tight closing device according to the invention is not limited to this sole application, as it can be used for all vessels or containers working with an internal pressure having an opening which must be closed in an absolutely tight manner by a removable lid. The invention extends to all vessels, pressure cookers, containers, etc. where the tight closing device according to the invention is applicable.

Of course the tight closing device and the internal pressure vessels to which it is applicable might receive any desired modifications. For instance, the inwardly extending flange of the body can have a large number of cut out parts, or might not have any at all. In that case the plane part of the lid has an outside cylindrical shape of a diameter slightly smaller than that of the opening made in the inwardly extending flange 20 of the vessel. The plastic gasket might eventually be reinforced, namely it might contain a core of metallic wire, for instance a core consisting of a cylindrical spiral spring, this core being embedded in the mass of the gasket when moulding it. The gasket can be of a section other than circular, for instance of elliptical section. In that case, the gasket is disposed as indicated on Fig. 7, namely with the large axis of its elliptical section parallel to the axis of the vessel. Thus one can reduce considerably the space left free between the part 2b of the lid and the internal face of the inwardly extending flange 20 of body 1. Similarly one can reduce the width of the inwardly extending flange 20, therefore the length of the lever arm of the force transmitted to this edge by the plastic gasket, making it possible to reduce the thickness of the sheet forming the body of the vessel. Finally this elliptical shape of the gasket results in an increase of its section in the direction of the shearing stresses.

What I claim as new is:

Fluid-tight closing device for vessels under pressure, which comprises a main cylindrical body, an upper edge flanged inwards substantially at right angles to the axis of said main cylindrical body, a lid having a lateral wall coaxial to said lateral wall of said main cylindrical body so as to leave an annular gap between said lateral walls, said lid having an edge flanged outwards substantially at right angles to the common axis of said body and lid, an annular sealing gasket having a circular section slightly greater than said annular gap, said gasket engaging said lid with a moderate frictional fit so as to follow the movements of said lid whereby said gasket in its closing position engages said lateral walls of said body and lid and also said flanged edges of said body and lid respectively, notches formed in said flanged edge of said body, said notches comprising a central portion merging in the lateral wall of said body, extensions formed along the flanged edge of said lid, a shoulder formed on the inner wall of said lid to constitute a rest for said lid in its lowermost position, the notches in the flanged edge of said body co-acting on the one hand with the lid edge extensions to permit the passage of said extensions and on the other hand with said sealing gasket to constitute therewith a safety valve.

References Cited in the file of this patent

UNITED STATES PATENTS

| | | |
|---|---|---|
| 1,499,364 | Goodrick | July 1, 1924 |
| 1,878,677 | Curtis | Sept. 20, 1932 |
| 2,399,115 | Hansen et al. | Apr. 23, 1946 |
| 2,544,854 | Oys et al. | Mar. 13, 1951 |
| 2,552,642 | Morrison | May 15, 1951 |
| 2,578,389 | Andersson | Dec. 11, 1951 |
| 2,626,560 | Burkhart | Jan. 27, 1953 |

FOREIGN PATENTS

| | | |
|---|---|---|
| 104,093 | Germany | June 29, 1899 |